United States Patent [19]

Skowronski et al.

[11] Patent Number: 5,032,086
[45] Date of Patent: Jul. 16, 1991

[54] WIRING HARNESS FOR WALL STRUCTURES

[75] Inventors: David M. Skowronski; Robert W. DeRoss; Michael J. O'Connell, all of Naperville, Ill.

[73] Assignee: Molex Incorporated, Lisle, Ill.

[21] Appl. No.: 498,660

[22] Filed: Mar. 19, 1990

[51] Int. Cl.$^5$ .................................... H01R 11/01
[52] U.S. Cl. .................... 439/210; 174/88 R; 439/215
[58] Field of Search ................ 179/48, 49, 100, 88 R; 439/207–216, 33

[56] References Cited

U.S. PATENT DOCUMENTS

| | | | |
|---|---|---|---|
| 3,464,052 | 8/1969 | Hukin | 439/215 |
| 3,819,848 | 6/1974 | Fry | 174/88 R X |
| 4,323,836 | 4/1982 | Rice | 174/48 X |
| 4,579,403 | 4/1986 | Byrne | 439/33 |

FOREIGN PATENT DOCUMENTS 0292380 11/1988 European Pat. Off. ............ 439/120

Primary Examiner—Eugene F. Desmond
Attorney, Agent, or Firm—Louis A. Hecht; Stephen Z. Weiss; Charles S. Cohen

[57] ABSTRACT

A wiring harness is disclosed for deploying electrical wires along a wall such as in a modular wall panel system for separating work areas. The wall has an elongate compartment defining a raceway for housing the wires. A first power block is positioned in the raceway at a first location and includes a given number of wires extending therefrom into the raceway. A second power block is positioned in the raceway at a second location longitudinally spaced from the first power block. The second power block has a different number of wires extending therefrom into the raceway toward the first power block. Splicing connectors electrically couple at least some of the wires between the two power blocks.

3 Claims, 1 Drawing Sheet

WIRING HARNESS FOR WALL STRUCTURES

FIELD OF THE INVENTION

This invention generally relates to wiring harnesses and, particularly, to an assembly for deploying electrical wires along a wall such as in a system for separating work areas.

BACKGROUND OF THE INVENTION

Modular wall panel system are being used to an ever increasing extent for forming interior partitions in buildings, because permanent walls do not provide the flexibility necessary for office environments wherein office layout changes constantly are being made. In buildings with conventional permanent walls, conventional wiring systems with power blocks, power cables, telephone wires and the like embedded in the permanent walls are being used with less frequency.

A typical modular wall panel system has a number of wall panels arranged in linear, angular or cornered arrays to divide a given space into separate work areas. Each work area might be provided with a number of electrical/electronic devices such as computers, telephones and the like which must be plugged into electrical outlets. Consequently, electrical wiring is run along, between and, normally, through the wall panels to provide electrical service for all of the work areas. The wall panels often have longitudinal compartments defining raceways for receiving power blocks or outlets and through which the electrical wiring is run. Most often, the raceways are formed along the bottom edges of the wall panels.

Heretofore, most such wiring systems have been a five-wire system including a ground wire, a neutral wire and three live wires. Many office building layouts presently are equipped with such five-wire systems. In order to increase the capabilities of the systems, such as going to an eight-wire system, heretofore the entire system has been reworked, including removing wiring harnesses mounted in the wall panel raceways, to convert to an expanded system, such as an eight-wire system. These conversion procedures are very expensive, including conversion of the permanent lead-in source systems in the permanent structure that electrically feeds the wiring system for the modular wall panels.

This invention is directed to solving these problems by providing a new conversion assembly or wiring harness which can be installed in a wall panel to increase its wiring capabilities, along with the capabilities of adjacent panels, without interrupting or replacing the permanent feed wiring.

SUMMARY OF THE INVENTION

An object, therefore, of the invention is to provide an assembly or wiring harness for deploying electrical wires along a wall such as in a wall panel system for separating wall areas.

In the exemplary embodiment of the invention, a modular wall panel system is contemplated wherein each modular wall or panel has an elongate compartment defining a raceway for housing the wires, such as along the bottom edge of the wall. A pre-wired harness is provided with a first power block, a second power block and electrical wiring extending therebetween. This harness is adapted for positioning in the raceway of the wall with the power blocks at spaced locations longitudinally thereof.

The invention contemplates that the first power block includes a given number of wires extending therefrom into the wall raceway. The second power block includes a different number of wires extending therefrom into the raceway toward the first power block. Generally, splice means are provided for electrically coupling at least some of the wires from the first power block with a different number of wires of the second power block. Though such splice means could include solder, in the preferred embodiment the splice means includes a plurality of splicing connectors for coupling a given number of wires to a different number of wires.

The specification herein shows a first power block having five wires, including a ground wire, a neutral wire and three live wires. The second power block has three neutral wires, two ground wires and three live wires. The three live wires from the two power blocks are common and run continuously between the two power blocks. The one ground wire of the first power block is coupled to the two ground wires of the second power block by one of the splicing connectors. The one neutral wire of the first power block is coupled by two of the splicing connectors to the three neutral wires of the second power block. Such a wiring harness can be placed in a raceway of a wall panel to increase the electrical capabilities of the adjoining work area, such as allowing the addition of a surge suppressor at that work area to protect computers or other electronic equipment in that area.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figures and in which:

DETAILED DESCRIPTION OF THE PREFERRED EMBODIMENT

Figure 1:
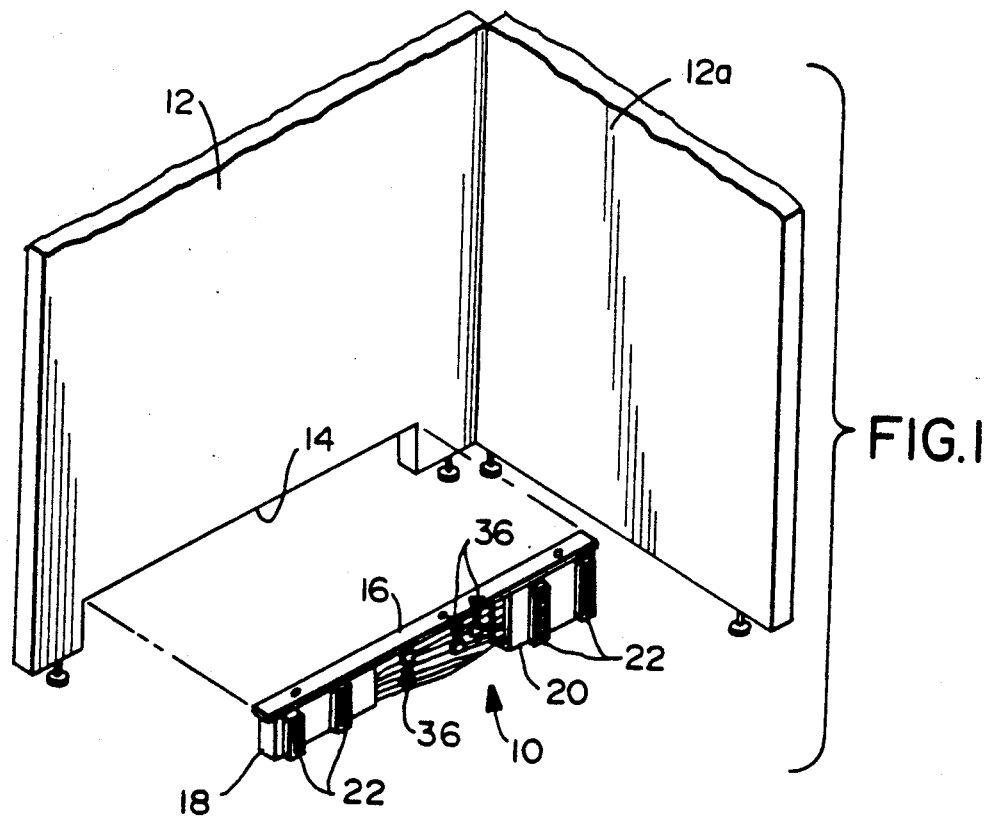
FIG. 1 is a fragmented perspective view of a work area bounded on at least two sides by a pair of wall panels of a modular wall system, and illustrating a wiring harness according to the invention positionable in a raceway at the bottom of one of the wall panels.

Referring to the drawings in greater detail, the electrical assembly or wiring harness of this invention is generally designated 10 and, referring to FIG. 1, is designed for deploying electrical wires along a wall 12 such as in a modular wall panel system for separating work areas. The walls may be in linear arrays, angular arrays as shown in FIG. 1, or in combinations of linear and angular arrays to define dividing junctures between a cluster of work areas. Some or all of the walls have an elongate compartment 14 defining a raceway for housing power blocks, wires and/or wiring harnesses. Some other walls, such as wall 12a in FIG. 1, may not be provided with such raceways.

Regardless of the particular modular arrangement or array of wall panels, the invention contemplates that wiring harness 10 be adapted for positioning, in toto, within one of the raceways of one of the wall panels. To that end, a frame 16 may be provided for mounting the wiring harness thereto for facilitating positioning the harness in the raceway, and the frame may be used to secure the harness in the raceway.

Figure 2:
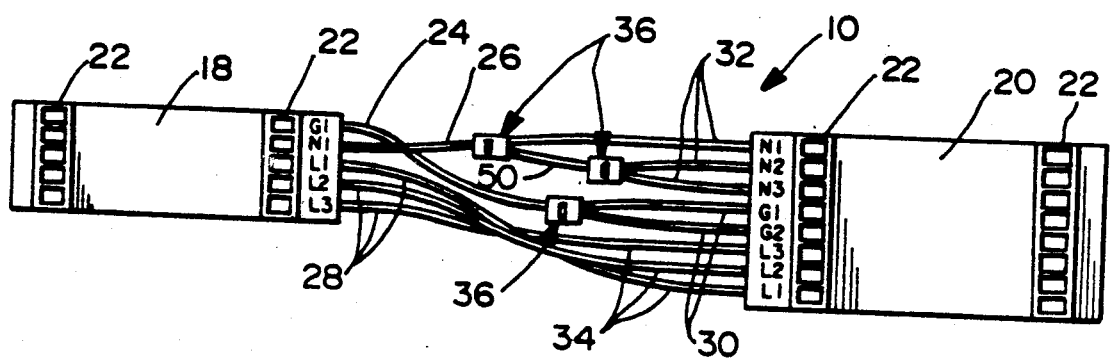
FIG. 2 is an elevational view, on an enlarged scale, of the wiring harness shown in FIG. 1.

Referring to FIG. 2 in conjunction with FIG. 1, wiring harness 10 includes a first power block 18 and a second power block 20 with electrical wires extending therebetween. The power blocks have outlets 22 into which plugs from appropriate electrical or electronic devices used in the work areas can be inserted to feed electricity to the devices.

First power block 18 is a five-wire device and includes one ground wire 24, one neutral wire 26 and three live wires 28. Power block 18 is electrically fed (not shown) in one manner or another from a permanent electrical source in the building either directly or through connecting means at the end of the raceway from another wall panel. This five-wire system is used quite widely in buildings today, and it is a continuing problem to increase the capabilities of the system.

To that end, second power block 20 has eight wires including two ground wires 30, three neutral wires 32 and three live wires 34. In the harness illustrated, live wires 28 emanating from power block 18 and live wires 34 emanating from power block 20 actually are common wires running continuously between the power blocks, as shown.

Generally, the invention contemplates utilizing splice means between the two power blocks having different numbers of wires in order to increase the capabilities of an existing system. The splice means shown in the illustrated embodiment includes a plurality of individual splicing connectors, generally designated 36.

Figure 3:
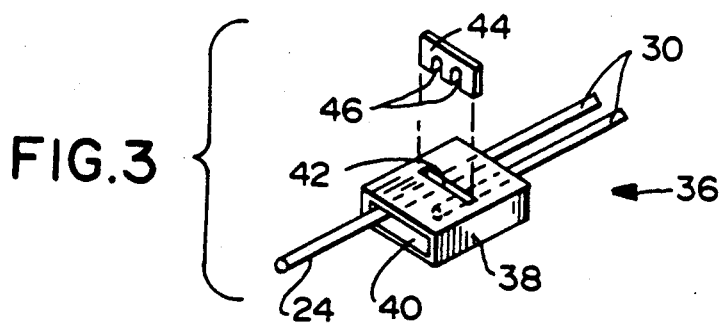
FIG. 3 is a perspective view, on a further enlarged scale, of one of the splicing connectors used with the wiring harness of FIGS. 1 and 2.

Referring to FIG. 3 in conjunction with FIGS. 1 and 2, each splicing connector 36 includes a housing 38 having a through opening 40 for receiving a single wire (such as ground wire 24) through one end and a pair of wires (such as ground wires 30) through the opposite end. Actually, as shown, ground wire 24 from power block 18 and the top or "G1" (FIG. 2) ground wire emanating from power block 20 can be a common wire running continuously between the power blocks, similar to live wires 28, 34. In any event, housing 38 of splicing connector 36 has a transverse slot 42 through which a insulation piercing splicer member 44 is driven into the interior of the housing, whereby a pair of notches 46 pierce the outer insulation of the wires and establish splicing conductivity between the two wires.

With the wiring scheme illustrated in FIG. 3, one of the splicing connectors is used to splice the one ground wire 24 ("G1") emanating from connector block 18 with the two ground wires 30 ("G1" and "G2") emanating from power block 20, as described in relation to FIG. 3. Two additional splicing connectors 36 are used to couple the one neutral wire 26 ("N1") emanating from power block 18 with the three neutral wires 32 ("N1", "N2" and "N3") emanating from power block 20. As described in relation to FIG. 2, some of these wires can run continuous between the power blocks. For instance, the top wire shown in FIG. 3 between the "N1" terminals of each power block can be a continuous wire. A splicing wire section 50 (FIG. 2) can run between the splicing connectors. Alternatively, the "N2" neutral wire from power block 20 can run continuously through the splicing connector with the remaining neutral wire "N3" leading into the splicing connector, i.e., the right-hand connector shown in FIG. 3.

With the harness shown and described above in detail in FIG. 3, any existing five-wire system can be converted to an eight-wire system in a single wall panel to increase the capabilities of the system. For instance, it often is desirable to add a surge suppressor to a work area for protecting computer or other electronic equipment used in that work area. Often, this could not be done with a five-wire system.

Once one of the harnesses 10 according to the invention is installed in a raceway in a wall panel, such as in raceway 14 in wall panel 12 shown in FIG. 1, an entire office space easily can be converted to an eight-wire system by leading the remaining wiring for the remaining wall panels off of the eight-wire power block 20. With the system of the invention, the existing wiring, usually permanent, of the building need not be disturbed or replaced. Yet, an entire layout of divided work areas can be upgraded or increased in capability by using the wiring harness described above with the interconnected wall panels having wiring harnesses with eight-wire power blocks at both opposite ends.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An assembly for deploying electrical wires along a wall such as in a system for separating work areas, the wall having an elongate compartment defining a raceway for housing the wires, comprising:

a first power block for positioning in the raceway at a first location and including a give number of wires extending therefrom into the raceway;

a second power block for positioning in the raceway at a second location longitudinally spaced from the first power block and including a different number of wires extending therefrom into the raceway toward the first power block; and splice means comprising a plurality of splicing connectors electrically coupling at least one wore from one of the power blocks with more than said at least one wore from the other power block;

wherein said first power block has five wires and said second power block has eight wires, and including three splicing connectors for coupling two wires from the first power block with five wires from the second power block.

2. The assembly of claim 1 wherein the remaining three wires from each power block comprise continuous wires running between the two power blocks.

3. The assembly of claim 1, including frame means for mounting the power blocks thereto, the frame means being adapted for positioning in the raceway of the wall.

* * * * *